H. W. CATER.
TONGUE OR SHAFT RELEASER.
APPLICATION FILED MAY 14, 1914.
1,164,466.
Patented Dec. 14, 1915.
2 SHEETS—SHEET 1.
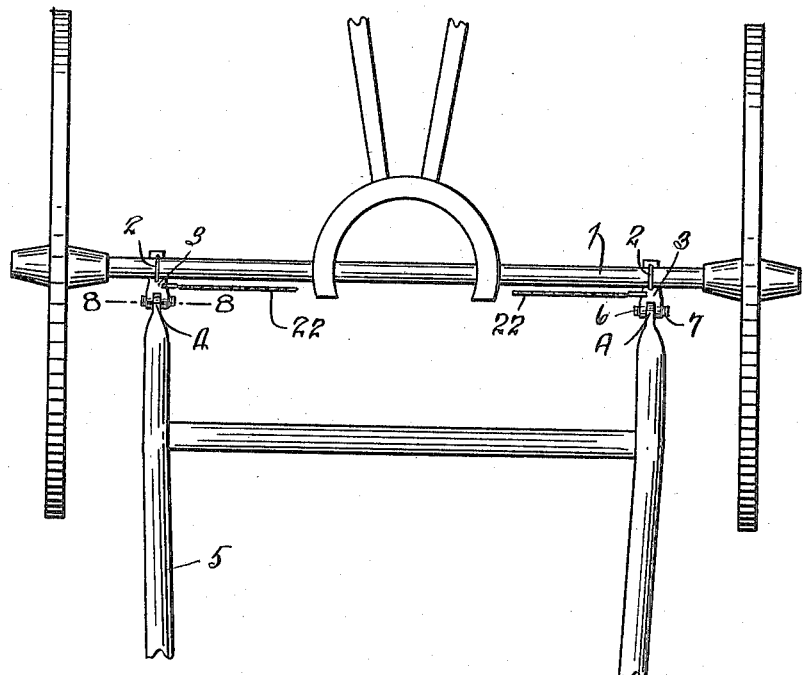
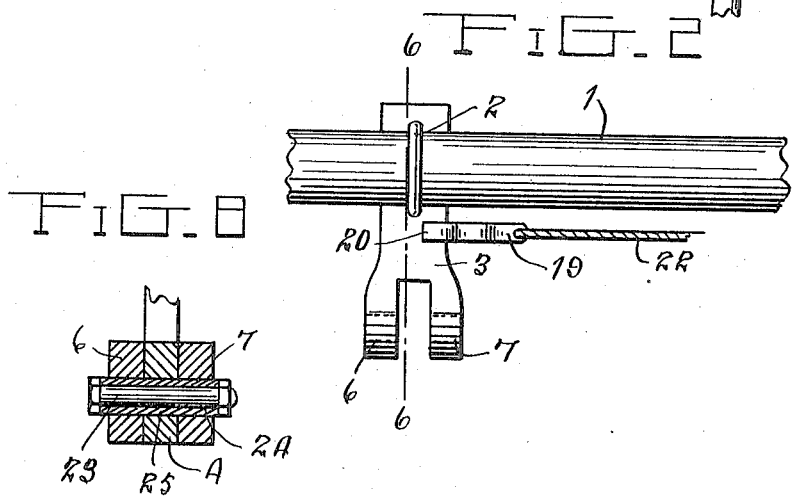
Inventor
H. W. Cater

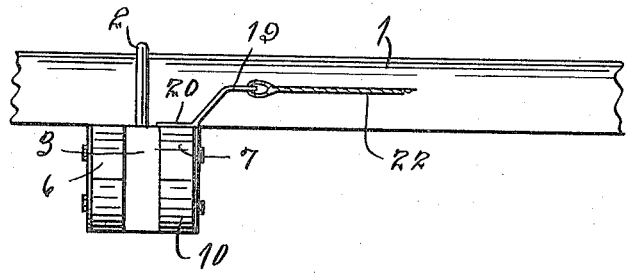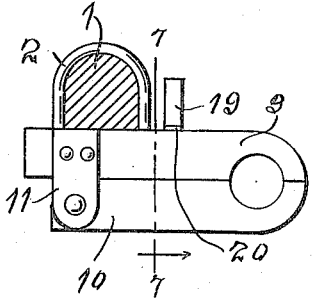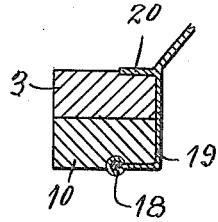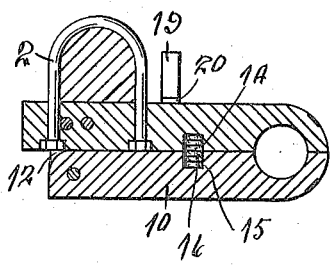

UNITED STATES PATENT OFFICE.

HARVEY W. CATER, OF SMEADLEY, ARKANSAS.

TONGUE OR SHAFT RELEASER.

1,164,466.   Specification of Letters Patent.   Patented Dec. 14, 1915.

Application filed May 14, 1914. Serial No. 838,532.

*To all whom it may concern:*

Be it known that I, HARVEY W. CATER, a citizen of the United States, residing at Smeadley, in the county of Johnson and State of Arkansas, have invented certain new and useful Improvements in Tongue or Shaft Releasers, of which the following is a specification.

This invention relates to vehicles, and more particularly to a device applicable for use upon pleasure vehicles such as buggies, surreys, or the like, which device is adapted for quick and convenient release of the tongue or shaft of the vehicle to permit of the release of the horse from the vehicle in cases where the horse becomes excited and runs away, or it is desired to release the horse from the vehicle for other purposes.

The primary object of this invention is the provision of a device as above specified, which is extremely simple in construction, embodying as few parts as possible to insure the proper and proficient performing of the functions of the same, and it embodies substantially a pair of jaws which are pivotally connected with respect to each other, and adapted for holding the shafts therebetween, for attaching the shafts or tongue to the vehicle, and which jaws are controllable by a single pulling movement upon a cord for the release of the shafts or tongue therefrom.

With the foregoing and other objects in view, this invention consists in such novel features of construction, combination, and arrangement of parts as will be hereinafter more fully described, illustrated in the accompanying drawings, and claimed.

In describing the invention in detail, reference will be had to the accompanying drawings, wherein like characters of reference designate like or corresponding parts throughout the several views, and in which:—

Figure 1 is a plan view showing a fragment of the running gears of a vehicle having the improved shaft or tongue releaser applied thereto, Fig. 2 is an enlarged fragmentary plan view of a part of the tongue releasing mechanism, Fig. 3 is a front elevation of the mechanism as shown in Fig. 2, Fig. 4 is a side elevation of the horse releasing mechanism, Fig. 5 is a side elevation of the shaft releasing mechanism showing the pivoted jaws open for release of the shaft or tongue therefrom, Fig. 6 is a cross sectional view on the line 6—6 of Fig. 2, Fig. 7 is a cross sectional view on the line 7—7 of Fig. 4, and Fig. 8 is a cross sectional view on the line 8—8 of Fig. 1.

Referring more particularly to the drawings, 1 designates the front axle of a vehicle of any ordinary type, such as a buggy or the like, which has secured thereto by staples or U-shaped bolts 2, the jaws 3. The axle 1 has the jaws 3 secured thereto adjacent its opposite ends, so as to receive the reduced ends 4 of the shafts 5, between the arms 6 and 7 thereof, which arms are formed upon the outer end of the jaws 3, by the bifurcation or recessing of the jaws. The jaws 3 are rigidly connected to the axle 1 by the U-shaped bolts 2, and they have their outer ends provided with semi-circular recesses 8, which recesses extend transversely across the under side of the arms 6 and 7 and aline with the semi-circular recesses 9, which are formed in the pivoted jaws 10. The jaws 10 are pivotally supported adjacent the rigid jaws 3, by brackets 11, which brackets are secured to the jaws 3 and depend therefrom supporting the jaws 10, which are pivotally connected to the lower ends of the brackets, immediately below the rigid jaws 3, as is clearly shown in various figures of the drawings. The pivoted jaws 10 have their corners 12, which are the upper rear corners thereof, rounded, so as to permit of the pivotal movement of the jaws 10 adjacent the jaws 3.

The jaws 3 and 10 are provided with recesses 14 and 15 formed therein intermediate their ends, which recesses aline one with the other when the meeting faces of the jaws are in abutting engagement one with the other, or when the jaws are closed, as is clearly shown in Figs. 4 and 6 of the drawings. The recesses 14 and 15 have helical springs 16 mounted therein, which springs tend to hold the jaws 10 in an outward or extended position as is clearly shown in Fig. 5 of the drawings.

The pivoted jaws 10 have pivotally connected to their under surface as at 18 resilient levers 19, which have arms 20 formed thereupon intermediate their end and extending transversely to the body portion of the levers. The arms 20 normally engage the upper surface of the rigid jaws 3, and hold the pivoted jaws 10 in abutting engagement with the rigid jaws 3, against the tension of the springs 16, when they are in engagement with the upper surfaces of the jaws 3, as is clearly shown in Fig. 7 of the drawings. The levers 19 have flexible members 22 connected to their upper outer terminal ends, which flexible members extend parallel with the front axle 1 for a short distance toward the center of the vehicle, and they extend upwardly and are positioned within the vehicle in any place from whence access may be conveniently gained thereto by the party driving the vehicle, so that when it is desired to release the horse or the shafts or pole from the vehicle, the flexible members 22 are pulled inwardly, which moves the levers 19, causing the arms 20 to move out of engagement with the upper surfaces of the rigid jaws 3, which permits the spring 16 to force the pivoted jaws 10 outwardly out of engagement with the rigid jaws 3, which will permit of the reduced ends 4 of the shaft 5 of the vehicle to be drawn forwardly out of the bifurcated portion of the arms, and also permit the bolt 23 and the sleeve 24 to pass out of the semi-circular recesses 8 and 9. The sleeve or thimble 24 is inserted through the opening 25, formed in the reduced ends 4 of the shafts 5, and it extends transversely through the semi-circular recesses 8 and 9, forming means for securely connecting the shafts to the axle 1 of the vehicle when the jaws are held together.

From the foregoing description, taken in connection with the accompanying drawings, the advantages of the construction and of the method of operation of the improved tongue or shaft releaser will be readily apparent to those skilled in the art to which this invention appertains and, while in the foregoing the principle of the operation has been described, together with various features of construction, it is to be understood that certain minor features of construction, combination, and arrangement of parts may be altered to suit practical conditions, provided such alterations are comprehended within the scope of what is claimed.

What is claimed is:—

The combination with a front axle of a vehicle, of a pair of jaws rigidly secured at opposite ends of said axle, and brackets secured to opposite sides of said jaws and depending therefrom, movable jaws pivotally secured between the brackets and having their pivotal ends rounded but movable therein, the outer ends of said jaws provided with circular recesses to correspond with one another forming a complete circle for holding a shaft therein, the inner faces of each of said jaws provided with recesses intermediate their ends, a coil spring secured in each of said recesses, U-shaped brackets having projecting portions extending therefrom, the arms of the U-shaped brackets engaging the pivotal and rigid jaws and hingedly secured to the pivotal jaw members, flexible connections secured to the projections of the U-shaped brackets for moving the same out of engagement with the rigid jaws whereby the lower jaws would be forced downwardly by the springs disposed therebetween and release the shafts held therein.

In testimony whereof I affix my signature in presence of two witnesses.

HARVEY W. CATER.

Witnesses:
M. S. PARK,
J. J. WAYMIRE.

Copies of this patent may be obtained for five cents each, by addressing the "Commissioner of Patents, Washington, D. C."